Figure 1:
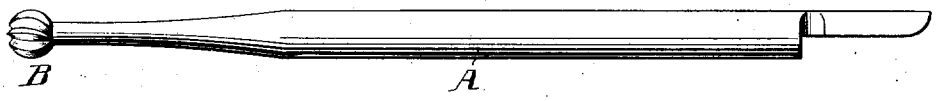

A. W. BROWNE.

Assignor to THE S. S. WHITE DENTAL MANUFACTURING COMPANY.

DENTIST'S BURRING TOOL.

No. 11,118. Reissued Oct. 28, 1890.

WITNESSES:

James H. Bell

J. Reese

INVENTOR

Arthur W. Browne

By Hollingsworth & Riley attorneys

THE NORRIS PETERS CO., PHOTO-LITHO., WASHINGTON, D. C.

UNITED STATES PATENT OFFICE.

ARTHUR W. BROWNE, OF PRINCE'S BAY, NEW YORK, ASSIGNOR TO THE S. S. WHITE DENTAL MANUFACTURING COMPANY, OF PHILADELPHIA, PENNSYLVANIA.

DENTIST'S BURRING-TOOL.

SPECIFICATION forming part of Reissued Letters Patent No. 11,118, dated October 28, 1890.

Original No. 372,400, dated November 1, 1887. Application for reissue filed July 31, 1890. Serial No. 360,589.

*To all whom it may concern:*

Be it known that I, ARTHUR W. BROWNE, a citizen of the United States, residing at Prince's Bay, in the county of Richmond and State of New York, have invented certain new and useful Improvements in Dentists' Burring-Tools; and I do hereby declare the following to be a full, clear, and exact description, such as will enable others skilled in the art to which it appertains to make and use the same.

My invention relates to excavating or cavity burrs more especially designed for dentists' use.

Excavating or cavity burrs, as made for dentists' use, are intended to cut their way into the tooth substance, whether advanced, after the manner of a drill, in the direction of their axis of rotation, or at an angle to this axis. They are made in a variety of forms and sizes to facilitate the excavating of all shapes and sizes of cavities. As a large part of the cutting these tools are used for is done in sensitive dentine, it is extremely desirable that they be constructed to do the work with the least possible pain to the patient. To accomplish this result the burrs must cut freely without the necessity of crowding them forward to their work and must free themselves constantly from chips, as in many cases when cutting in close proximity to a nerve the least pressure or heat becomes almost unbearable. It is a fact that the old form of burrs heretofore in use will cut with much less pressure and more freely when advanced in a line at right angles to the axis of rotation than when advanced in the line of its axis. Several reasons may be given for this.

First. The teeth or leaves of the burr all coming together at the end of the axis there is no cutting-edge at this point. In fact it has usually been the practice to put a small cut across the extreme end of the burr, in which case, on using the end of the burrs, there is a small projection of the material operated in which cannot be cut by the burr, and which must break away in order to allow the tool to advance.

Second. In advancing the burr in the line of its axis every tooth or leaf—and there are usually eight—will be constantly cutting, while if advanced at right angles to its axis two, or at most three, teeth are all that can be brought into action at any one time. It of course requires four times as much pressure to make eight cutting-edges of a given length penetrate the material as would be necessary to make two teeth of the same length take a like cut.

Third. It is a fact that in the old form of burr the spaces between the teeth or leaves near the end of the axis of the burr are much narrower and the cuts shallower than at any other portion, so that there is little room for chips. This is due to the fact that as the leaves or edges all come together substantially at this axis the intermediate spaces vanish not only circumferentially (or in their width) but radially (or in their depth) also, and thus little or no clearance is afforded at or near the axis. In the case of a simple burr intended for lateral enlargement of a hole already formed, such end clearance fills no important function; but where forward drilling is attempted with such burrs I find in practice that the chips do not get away from the cutting-edge freely enough to prevent the spaces from choking, when of course there is great heat developed from the resulting friction and very little cutting is accomplished.

The object of my present invention is to provide an improved burring-tool in which the objections to and imperfections in the old style of burr, noted above, will be avoided.

The improvements made by me will first be described, with the aid of the accompanying drawings, sufficiently in detail to enable them to be clearly understood. I will then distinctly recite the subject-matter claimed herein as my invention at the close of this specification.

Figure 2:
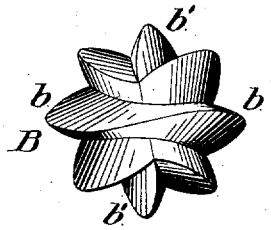
Figure 3:
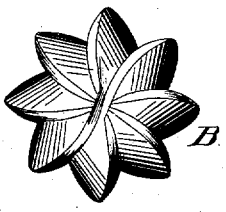
Figure 4:
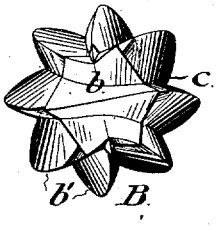
Figure 5:
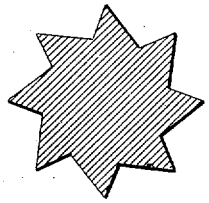
Figure 6:
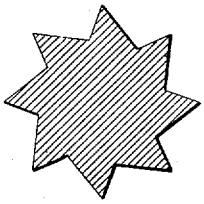
Figure 7:
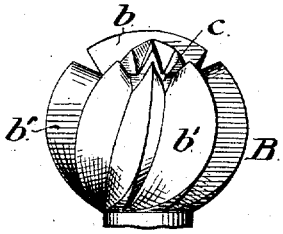

In said drawings, Figure 1 is a view of my improved burring-tools, with the shank thereof having a flattened transversely-grooved driving end to adapt it to the rotary tool-carrier of a dental-engine hand-piece, such as are in common use. Fig. 2 is a view of the front end of the improved burr, and Fig. 3 is a similar view of the front end of a burr of the old style. Fig. 4 is a similar view of another form of my improved burr. Figs. 5 and 6 are respectively cross-sections of the burr shown in Figs. 2 and 3, and Fig. 7 is a side elevation of the burr-head shown in Fig. 4.

The shank A of my improved burring-tool may be of any desired or practicable form to adapt it to the carrier which is to rotate it.

My invention has relation only to the working end or head B of the tool, which may be substantially round—a shape commonly employed—or of other form. Two of the opposite cutting blades or leaves *b* of the burr-head are or may be substantially continuous, as clearly shown in Fig. 2, meeting at the extremity of the axis of rotation and forming a single long cutting or drilling edge or blade, while upon either side thereof the other cutting or burring leaves or edges *b'* are brought together in groups, as clearly shown outside the axis of rotation. As the terminal or vanishing points of these edges *b'* are not immediately adjacent to the axis there is no difficulty in providing a clearance of very considerable depth on each side of the drilling-edge where it crosses the axis. At their nearest approach to the axis such clearance-spaces are preferably somewhat less in depth than the radial distance from the axis to the vanishing points of the burr-edges *b'*, and they increase in capacity from said points until they reach their greatest distance from the axis. Thus they will be sufficient to permit the retreat of the chips as the drill-edge advances. There is therefore a single drill or cutting-edge at the axis of the burr and the burr will, in operation, advance in this direction as readily as will a drill, which it practically is, while the large deep cuts or clearance-spaces upon either side allow the chips to pass back almost in straight lines, so as to free the burr as rapidly as the chips are cut. It is also evident that when advancing in the direction of its axis, or drilling, there will be a much less total length of cutting-edge in operation than in the old form.

In practice I have found that my improved burr will cut on the end or drill with very much less pressure than is required by the old form of burr and will advance, throwing the chips behind it, more rapidly and without generating appreciable heat. In opening a cavity in a tooth, for example, it has been the custom with careful operators, owing to the difficulties referred to, first to penetrate to the depth necessary with a drill and then, having exchanged the drill for a burr, to enlarge the cavity to the required dimensions. With my improved burr-drill this change of tools will be unnecessary, as the burr will perform the office of the drill in a superior manner, as well as do what has heretofore been thought to be its own proper work.

In Figs. 4 and 7 I have shown a form of my improved burr-drill differing from that of Figs. 1 and 2. The form shown in Figs. 4 and 7 has the single cutting or drilling edge *b* at the extremity of the axis of the burr; but said edge is shorter than in the form shown in Fig. 2, an annular groove *c* being cut around the crown or body of the burr, so as to form the front projecting ends of the side leaves or teeth *b'*, virtually a circular cutting-edge in rear of the front drilling-edge of the burr.

I am aware that in certain forms of non-excavating burrs—such, for instance, as the "cherry," used to smooth out cavities of bullet-molds—it has been customary to form a series of edges crossing the front end of the burr in continuity but at random or without symmetrical relation to its axis, and I therefore do not intend to include instruments of this character in my claim, hereinafter made. Such cherries, however, not being intended to drill, were not provided with clearance-spaces of the character I have above described, nor were they provided with the single drill-edge proper, intersecting the axis of rotation, which characterizes my invention, and so far as excavation was concerned possessed no advantages over the form of burr which I have shown in Fig. 3.

I deem it unnecessary to illustrate or describe other forms of my improved burr-drill, and therefore, without further elaboration,

I claim—

The burr-drill consisting of the lateral burr-edges, in combination with the single drill-edge crossing the axis of rotation of the tool and formed with clearance-spaces, substantially of the character set forth, between said drill-edge and said burr-edges.

In testimony whereof I have affixed my signature in the presence of two witnesses.

ARTHUR W. BROWNE.

Witnesses:
ELI T. STARR,
E. REESE.